H. Disston,
Hand Saw.

Nº 63,025.        Patented Mar. 19, 1867.

Witnesses:

Wm Albert Stub.
John Parker.

Inventor:

Henry Disston
By his Atty
H. Howson

United States Patent Office.

HENRY DISSTON, OF PHILADELPHIA, PENNSYLVANIA.

Letters Patent No. 63,025, dated March 19, 1867.

IMPROVEMENT IN BUCK-SAW FRAMES.

The Schedule referred to in these Letters Patent and making part of the same.

TO ALL WHOM IT MAY CONCERN:

Be it known that I, HENRY DISSTON, of Philadelphia, Pennsylvania, have invented an Improvement in Saws; and I do hereby declare the following to be a full, clear, and exact description of the same, reference being had to the accompanying drawing, and to the letters of reference marked thereon.

My invention relates to that class of saws in which the blade is secured to two arms, one of which is adjustable so as to regulate the tension on the blade, and is secured in its position by means of a rack catching on a pin; and my improvement consists of a guard covering the said rack, as described hereafter, whereby the operator is enabled to adjust and release the saw-frame without that wounding of the hands which frequently resulted in handling the saw as heretofore constructed.

In order to enable others skilled in the art to make and use my invention, I will now proceed to describe its construction and operation, reference being had to the accompanying drawing, which forms a part of this specification, and in which —

Figure 1:
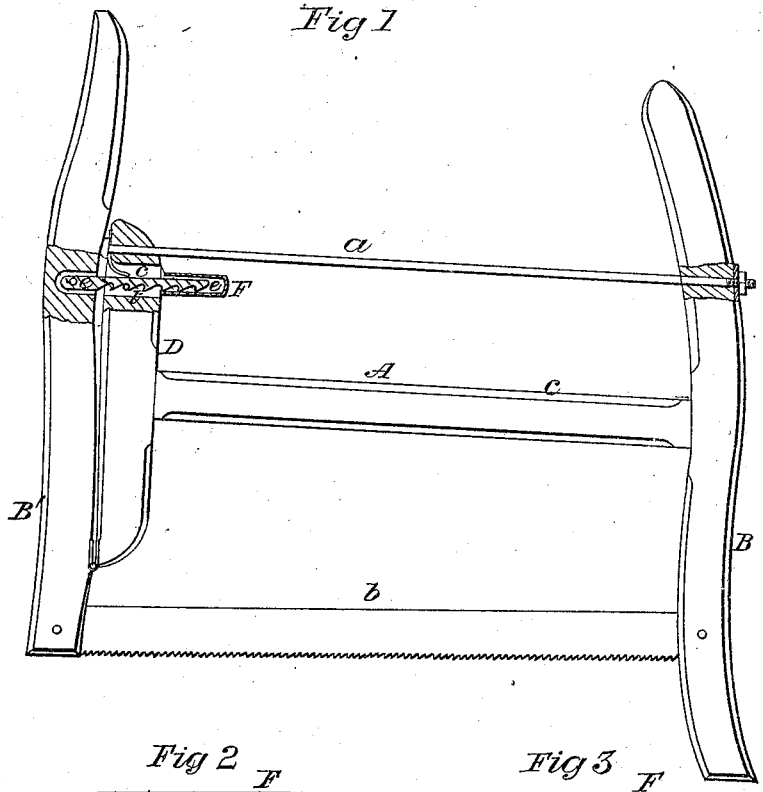

Figure 1 is a side view, partly in section, of a saw with my improvement; and

Figure 2:
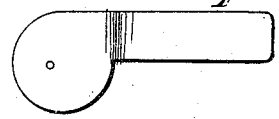
Figure 3:
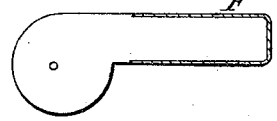
Figure 4:
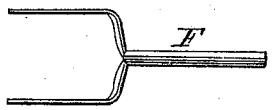

Figures 2, 3, and 4, detached views of part of the saw.

The frame A of the saw consists of the arms B B', cross-piece C, and bar D; the cross-piece being fitted at one end to the arm B, and at the other to the bar D, which is hinged to the arm B' near the lower end of the latter. The bar D and arm B are also connected by a bolt, $a$; and to the lower ends of the two arms B and B' is secured the saw-blade $b$.

To the arm B' is connected one end of a rack, $e$, the opposite end of which projects through an opening in the upper end of the bar D, and across this opening extends a pin, $t$; the toothed edge of the rack $e$ being maintained in contact with the pin by a spring, $c$, which is secured to the bar D by the bolt $a$, as shown in the drawing.

When the saw-blade becomes slack the tension is increased by bringing the upper end of the bar B' closer to the bar D, the arm being held in its position by the rack which slides forward and catches into the pin $t$.

When the saw is to be slackened the rack $e$ is elevated from contact with the pin $t$, so that the arm B' may be moved outward.

The devices above described are similar to those in saws heretofore used, and although very efficient for imparting the desired tension to the saw-blade, they are objectionable so far as regards the exposure of the rack $e$, which, on being raised to release the arm B', moves suddenly through the opening in the bar D, and is apt to cut or otherwise injure the hand of the operator.

In order to prevent such accidents, I secure to the bar D a guard, F, which consists of a flat tube open at one end to receive the rack $e$, and hung to the pin $t$ so as to be capable of the slight vertical movement required to raise and depress the end of the rack, this guard effectually preventing the hand of the operator from coming in contact with or being injured by the rack, without interfering with the free movements of the latter.

Without confining myself to a guard of the precise form herein described and shown, I claim as my invention, and desire to secure by Letters Patent—

The guard F, enclosing a portion of the rack $e$, and connected to the bar D of the saw-frame, all substantially as described for the purpose specified.

In testimony whereof I have signed my name to this specification in the presence of two subscribing witnesses.

HENRY DISSTON.

Witnesses:
CHARLES E. FOSTER,
WM. HALL WAXLER.